(12) United States Patent
Lin et al.

(10) Patent No.: US 10,056,789 B2
(45) Date of Patent: Aug. 21, 2018

(54) WIRELESS SENSOR AND MACHINE TOOL INCLUDING THE SAME

(71) Applicant: National Chi Nan University, Puli, Nantou (TW)

(72) Inventors: Yo-Sheng Lin, Nantou (TW); Kai-Siang Lan, Nantou (TW)

(73) Assignee: National Chi Nan University, Puli, Nantou (TW)

( * ) Notice: Subject to any disclaimer, the term of this patent is extended or adjusted under 35 U.S.C. 154(b) by 117 days.

(21) Appl. No.: 15/381,398

(22) Filed: Dec. 16, 2016

(65) Prior Publication Data

US 2018/0019621 A1 Jan. 18, 2018

(30) Foreign Application Priority Data

Jul. 12, 2016 (TW) .............................. 105121877 A (51) Int. Cl.
*H02J 50/20* (2016.01)
*B23Q 1/00* (2006.01)
*H02J 7/02* (2016.01)
*H04B 5/00* (2006.01)
*B23Q 1/70* (2006.01)

(52) U.S. Cl.
CPC ............ *H02J 50/20* (2016.02); *B23Q 1/0009* (2013.01); *H02J 7/025* (2013.01); *H04B 5/0037* (2013.01); *B23Q 1/70* (2013.01)

(58) Field of Classification Search
CPC ........ H02J 50/20; H02J 7/025; H04B 5/0037; B23Q 1/0009
See application file for complete search history.

(56) References Cited

U.S. PATENT DOCUMENTS

| | | | | |
|---|---|---|---|---|
| 5,544,073 A | * | 8/1996 | Piety ...................... | G01M 1/08 700/279 |
| 2009/0115629 A1 | * | 5/2009 | Duffy ..................... | G01D 21/00 340/870.07 |
| 2011/0137587 A1 | * | 6/2011 | Rothlisberger ........ | B65G 43/00 702/56 |
| 2016/0190872 A1 | * | 6/2016 | Bohn ...................... | H02J 7/025 307/104 |

* cited by examiner

*Primary Examiner* — Daniel Kessie
(74) *Attorney, Agent, or Firm* — Merchant & Gould P.C.

(57) ABSTRACT

A wireless sensor includes a wireless power module, a sensor module generating a sensor output, an analog-to-digital converter (ADC) module connected to the sensor module, a wireless transceiver (TRX) module operating in a receiving state by default to receive an RF input signal, transmitting an RF output signal based on digital signals when in a transmitting state, and switching back to the receiving state after a period, and a processing module connected to the ADC and TRX modules, activating the ADC module to convert the sensor output to the digital outputs when the TRX module is in the receiving state, and when receiving the digital signals, deactivating the ADC module and switching the TRX module to the transmitting state.

9 Claims, 8 Drawing Sheets

WIRELESS SENSOR AND MACHINE TOOL INCLUDING THE SAME

CROSS-REFERENCE TO RELATED APPLICATION

This application claims priority of Taiwanese Patent Application No. 105121877, filed on Jul. 12, 2016.

FIELD

The disclosure relates to a sensor, and more particularly to a wireless sensor being wirelessly powered and being applicable to a machine tool.

BACKGROUND

A machine tool includes a metal housing formed with a through hole, a shaft, and a bearing sleeved on the shaft. A conventional sensor is disposed in the machine tool and includes a sensor module and a battery for supplying electrical energy to the conventional sensor. The sensor module is utilized to sense states of the shaft and the bearing of the machine tool for generating a sensor output, which is transmitted via a transmission line that is electrically connected to the conventional sensor and that passes through the through hole to a receiving device external to the machine tool.

Due to the shielding effect caused by the metal housing, the conventional sensor cannot be wirelessly powered by electrical energy from outside of the machine tool, so the battery is required to be disposed in the machine tool. However, the battery has limited battery capacity, and replacing the battery inside the machine tool when the battery runs down proves to be a troublesome task. In addition, formation of the through hole in the metal housing may incur a higher manufacturing cost and reduce the service life of the machine tool. Moreover, in order to connect the conventional sensor and the receiving device with the transmission line, a relatively complicated design should be considered for the wiring of the conventional sensor, causing limited choices in terms of placement of the conventional sensor.

SUMMARY

Therefore, an object of the disclosure is to provide a wirelessly powered wireless sensor and a machine tool including the wireless sensor that can alleviate at least one of the drawbacks of the prior art.

According to one aspect of the disclosure, the wireless sensor is applicable to a machine tool that includes a shaft and a bearing sleeved on the shaft. The wireless sensor includes a wireless power module, a sensor module, an analog-to-digital converter (ADC) module, a wireless transceiver module and a processing module.

The wireless power module is configured to receive a microwave pulse signal, to generate electrical energy according to the microwave pulse signal, and to supply the electrical energy to the wireless sensor.

The sensor module is configured to sense states of the shaft and the bearing of the machine tool for generating a sensor output. The sensor output includes a first sensor signal that is associated with a torque of the shaft, a second sensor signal that is associated with a displacement of the shaft, a third sensor signal that is associated with vibration of the shaft, and a fourth sensor signal that is associated with a temperature of the bearing.

The ADC module is electrically connected to the sensor module for receiving the first, second, third and fourth sensor signals, and is configured to be activated in response to receipt of an enable signal for converting the first, second, third and fourth sensor signals respectively to first, second, third and fourth digital signals and for outputting the first, second, third and fourth digital signals, and to be deactivated in response to receipt of a disable signal.

The wireless transceiver module is to operate in a receiving state by default, and is configured to switch from the receiving state to a transmitting state in response to receipt of a switching signal, and from the transmitting state back to the receiving state after a predetermined period has elapsed, to receive wirelessly a radio frequency (RF) input signal when the wireless transceiver module operates in the receiving state, and to generate, according to the RF input signal, a first control signal for output.

The processing module is electrically connected to the ADC module and to the wireless transceiver module, and is configured to generate the enable signal when receiving the first control signal from the wireless transceiver module, to output the enable signal to the ADC module for activating the ADC module to generate the first, second, third and fourth digital signals and to output the first, second, third and fourth digital signals to the processing module, to generate the disable signal and the switching signal when receiving the first, second, third and fourth digital signals from the ADC module, to output the disable signal and the switching signal respectively to the ADC module and the wireless transceiver module for activating the ADC module and for enabling the wireless transceiver module to operate in the transmitting state, to generate, according to the first, second, third and fourth digital signals, an encoded signal, and to output the encoded signal to the wireless transceiver module for enabling the wireless transceiver module to transmit wirelessly, according to the encoded signal from the processing module, an RF output signal which is associated with the sensor output.

According to another aspect of the disclosure, the machine tool includes a shaft, a bearing sleeved on the shaft, the wireless sensor as mentioned above, and a housing that is made of a non-conductive material for accommodating the shaft, the bearing and the wireless sensor.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Before the disclosure is described in greater detail, it should be noted that where considered appropriate, reference numerals or terminal portions of reference numerals have been repeated among the figures to indicate corresponding or analogous elements, which may optionally have similar characteristics.

Figure 1:
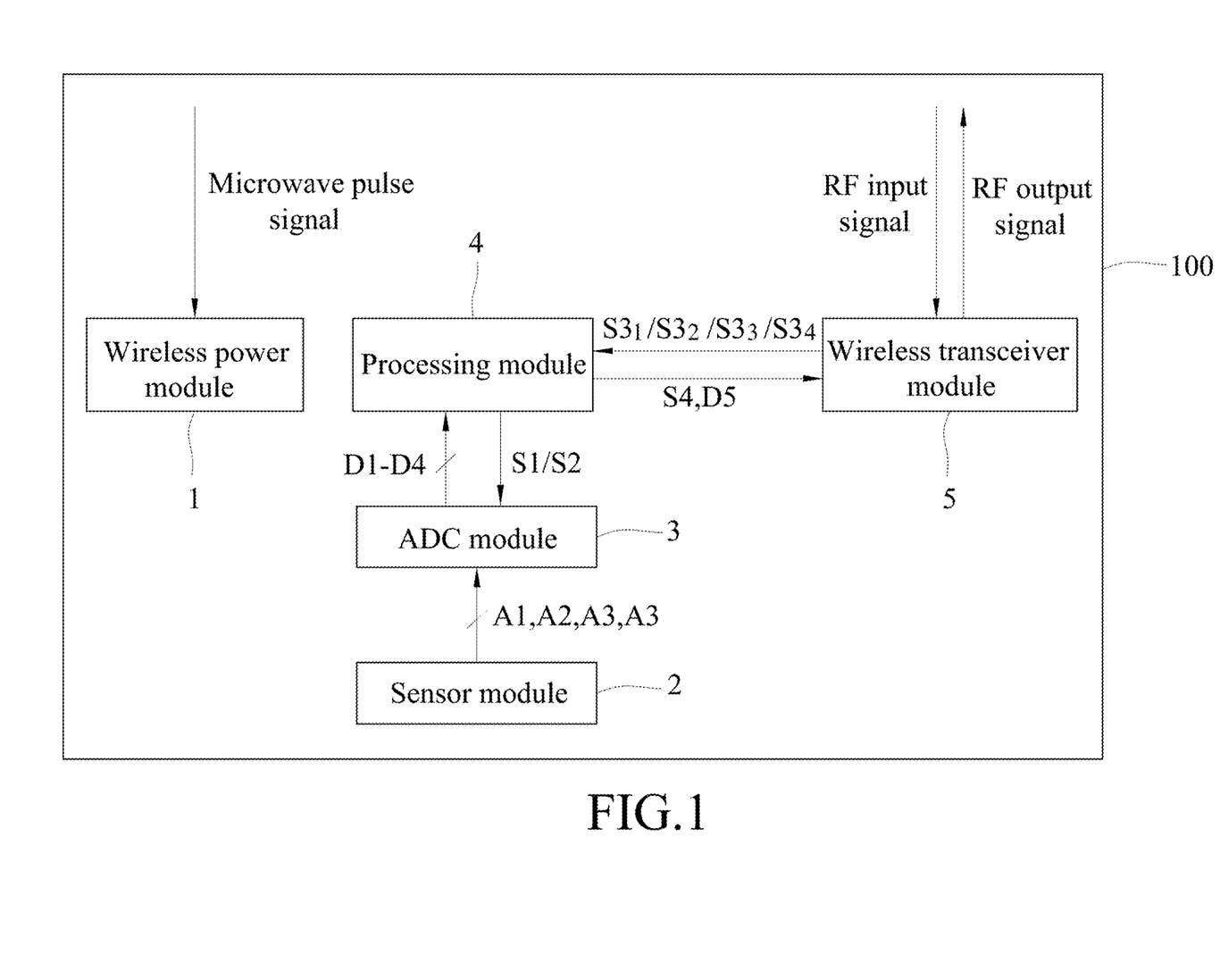
FIG. 1 is a block diagram illustrating an embodiment of a wireless sensor being wirelessly powered according to the disclosure.
Figure 2:
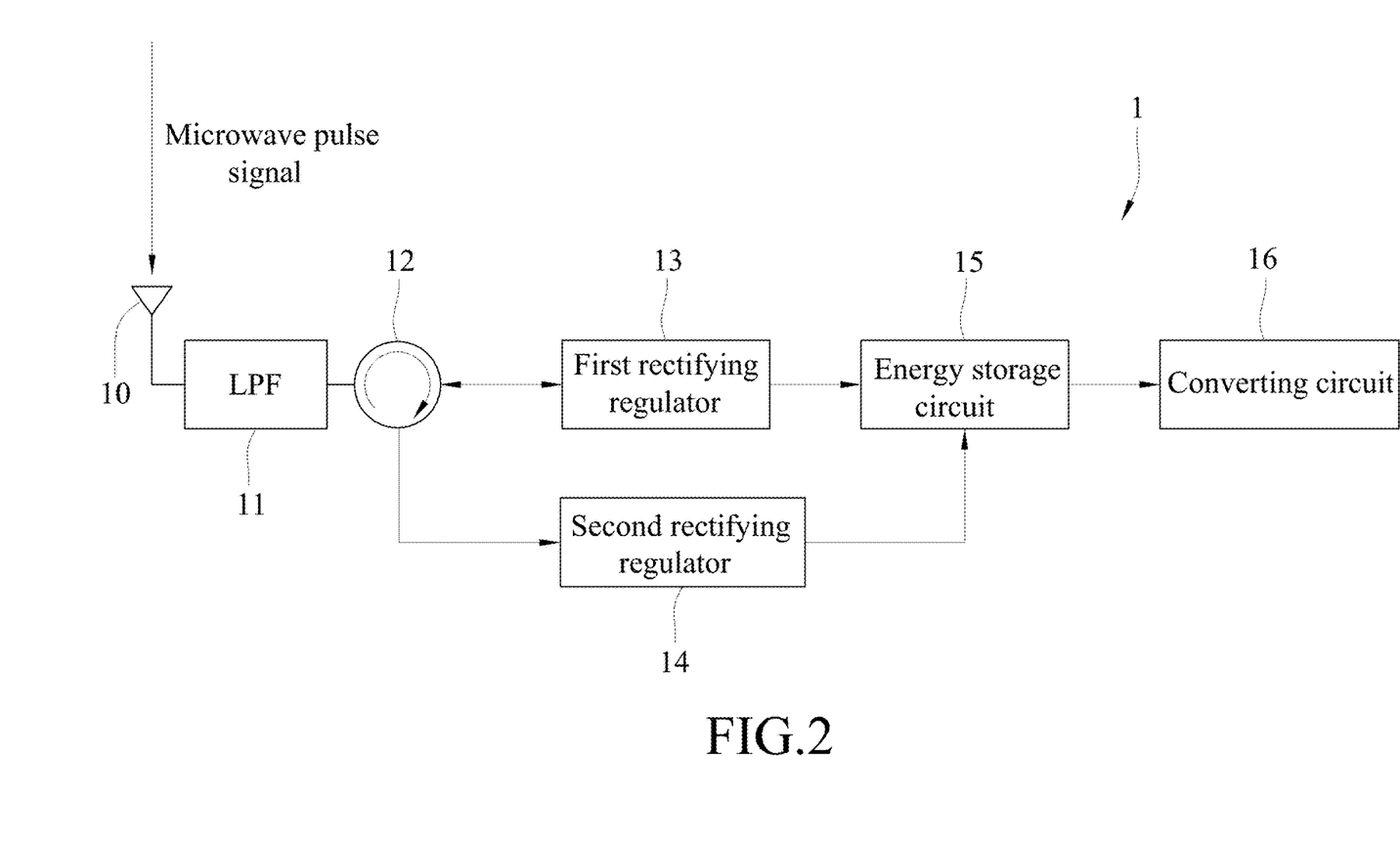
FIG. 2 is a schematic diagram illustrating an embodiment of a wireless power module of the wireless sensor.
Figure 8:
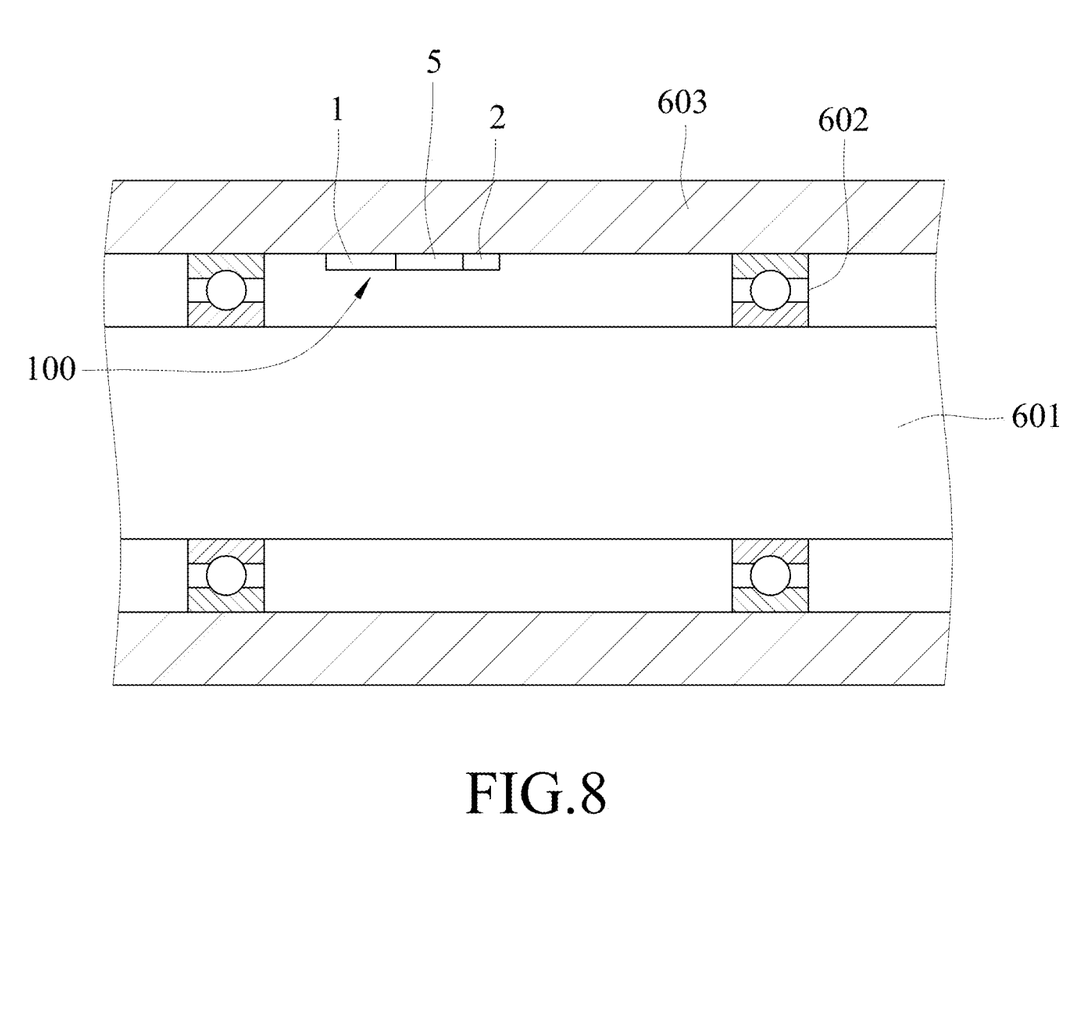
FIG. 8 is a diagram illustrating an embodiment of a machine tool according to the disclosure.

Referring to FIGS. 1 and 2, an embodiment of a wireless sensor 100 able to be wirelessly powered and being applicable to a machine tool (FIG. 8) is illustrated. The machine tool includes a shaft 601, at least one bearing 602 sleeved on the shaft 601, and a housing 603 that is made of a non-conductive material for accommodating the shaft 601, the bearing 602 and the wireless sensor 100. The housing 603 can be made of, but not limited to, a material selected from the group consisting of a carbon fiber composite material, fiber-reinforced plastic (FRP), and a combination thereof.

The wireless sensor 100 includes a wireless power module 1, a sensor module 2, an analog-to-digital converter (ADC) module 3, a processing module 4 and a wireless transceiver module 5.

The wireless power module 1 is configured to receive a microwave pulse signal, to generate electrical energy according to the microwave pulse signal, and to supply the electrical energy to the wireless sensor 100. Fabricating the housing of the machine tool by a non-conductive material alleviates the issue of shielding effect caused by a metal housing of a conventional machine tool, and facilitates transmission of the microwave pulse signal to the wireless power module 1.

In this embodiment, the wireless power module 1 includes a microwave antenna 10, a low-pass filter (LPF) 11, a circulator 12, a first rectifying regulator 13, a second rectifying regulator 14, an energy storage circuit 15 and a converting circuit 16.

The microwave antenna 10 is configured to receive the microwave pulse signal.

The LPF 11 is electrically connected to the microwave antenna 10 for receiving the microwave pulse signal therefrom and is configured to generate a filtered signal according to the microwave pulse signal.

The circulator 12 is electrically connected to the LPF 11 for receiving the filtered signal therefrom, and is configured to generate a first circulator signal according to the filtered signal, and to generate a second circulator signal according to a reflected signal that is associated with a reflection of the first circulating signal.

The first rectifying regulator 13 is electrically connected to the circulator 12 for receiving the first circulator signal therefrom, and is configured to generate a first rectified regulated signal by rectifying the first circulating signal, to generate the reflected signal according to the first circulator signal, and to output the reflected signal to the circulator 12.

The second rectifying regulator 14 is electrically connected to the circulator 12 for receiving the second circulator signal therefrom, and is configured to generate a second rectified regulated signal by rectifying the second circulator signal.

In this embodiment, the first and second rectifying regulators 13 and 14 are configured as a master-slave rectifier. The first rectifying regulator 13 is similar to the second rectifying regulator 14, and may be implemented by a first embodiment, a second embodiment, a third embodiment and a fourth embodiment that are respectively illustrated in FIGS. 3-6.

Figure 3:
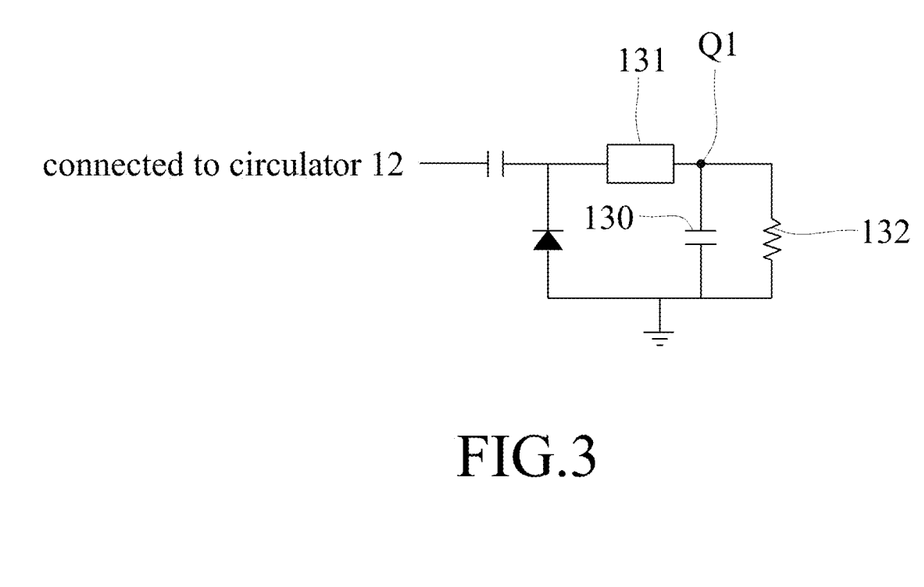
FIG. 3 is a circuit diagram illustrating a first embodiment of each of a first rectifying regulator and a second rectifying regulator of the wireless power module.
Figure 4:
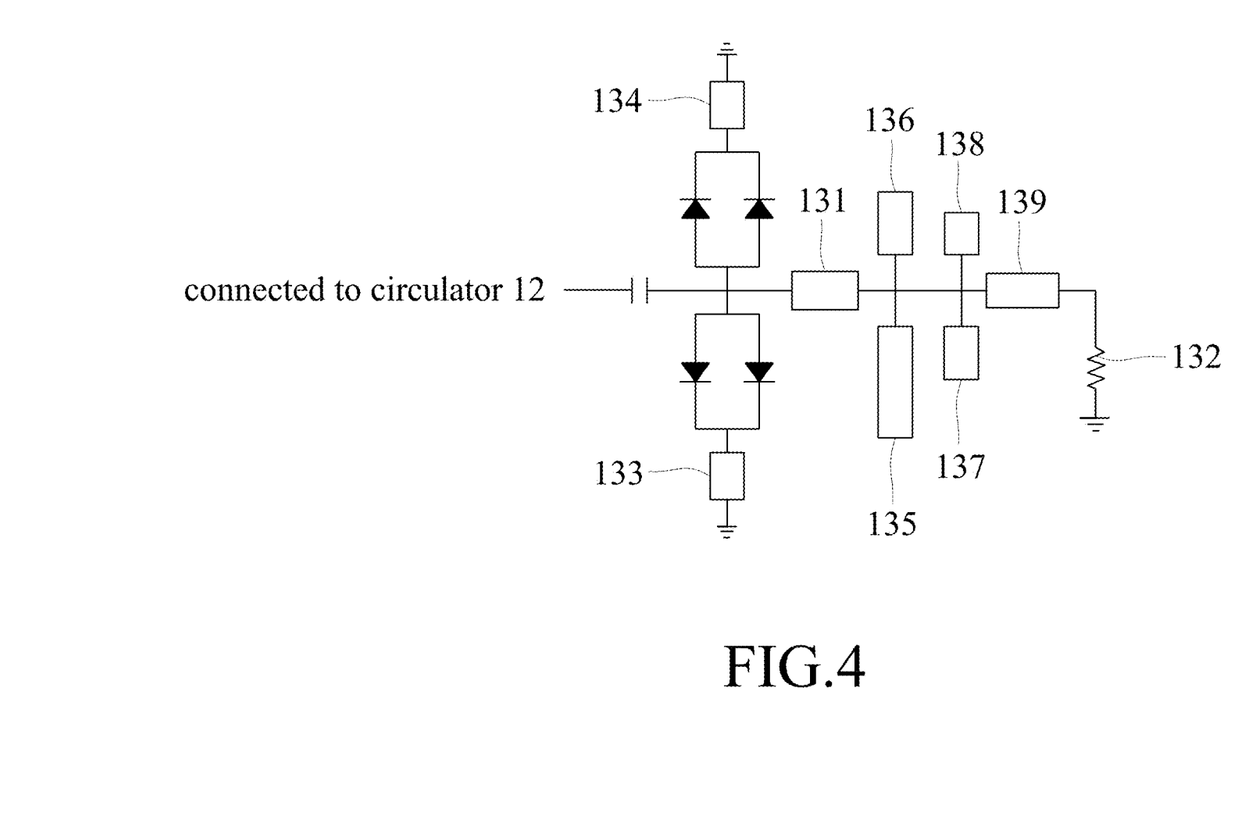
FIG. 4 is a circuit diagram illustrating a second embodiment of each of the first rectifying regulator and the second rectifying regulator of the wireless power module.
Figure 5:
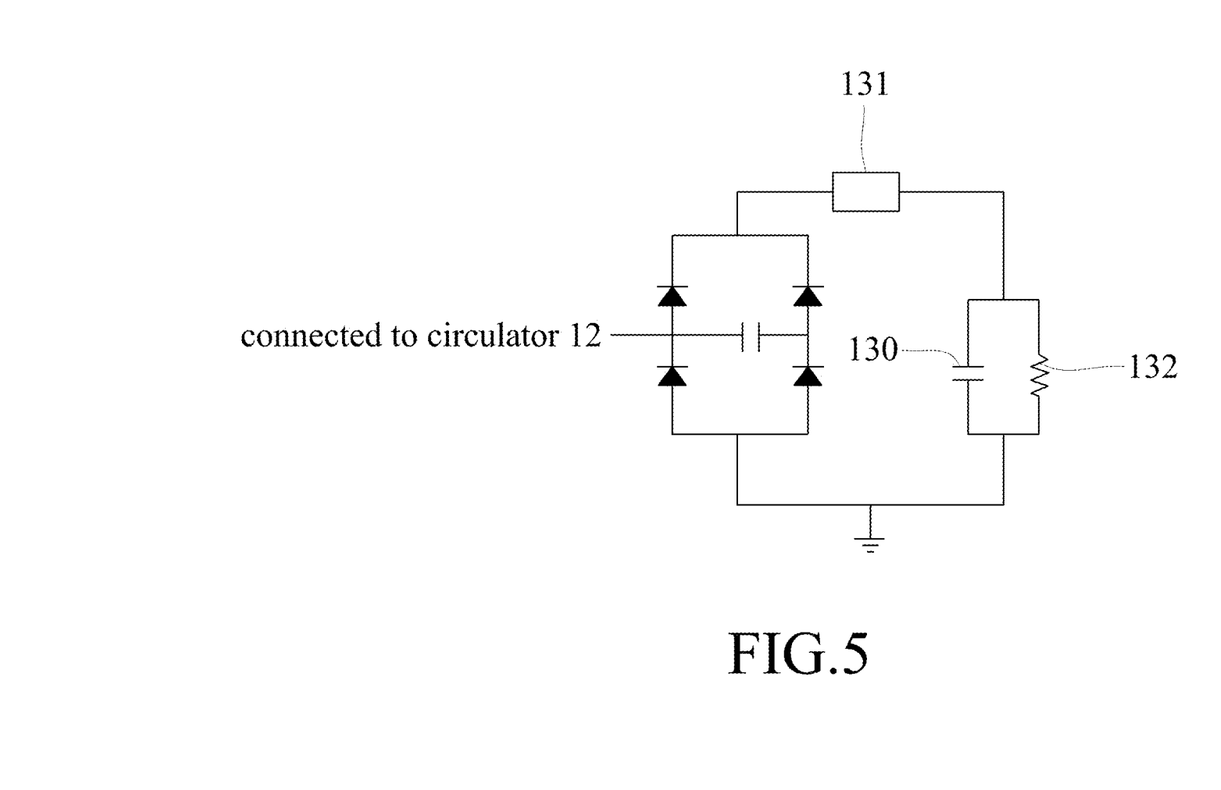
FIG. 5 is a circuit diagram illustrating a third embodiment of each of the first rectifying regulator and the second rectifying regulator of the wireless power module.
Figure 6:
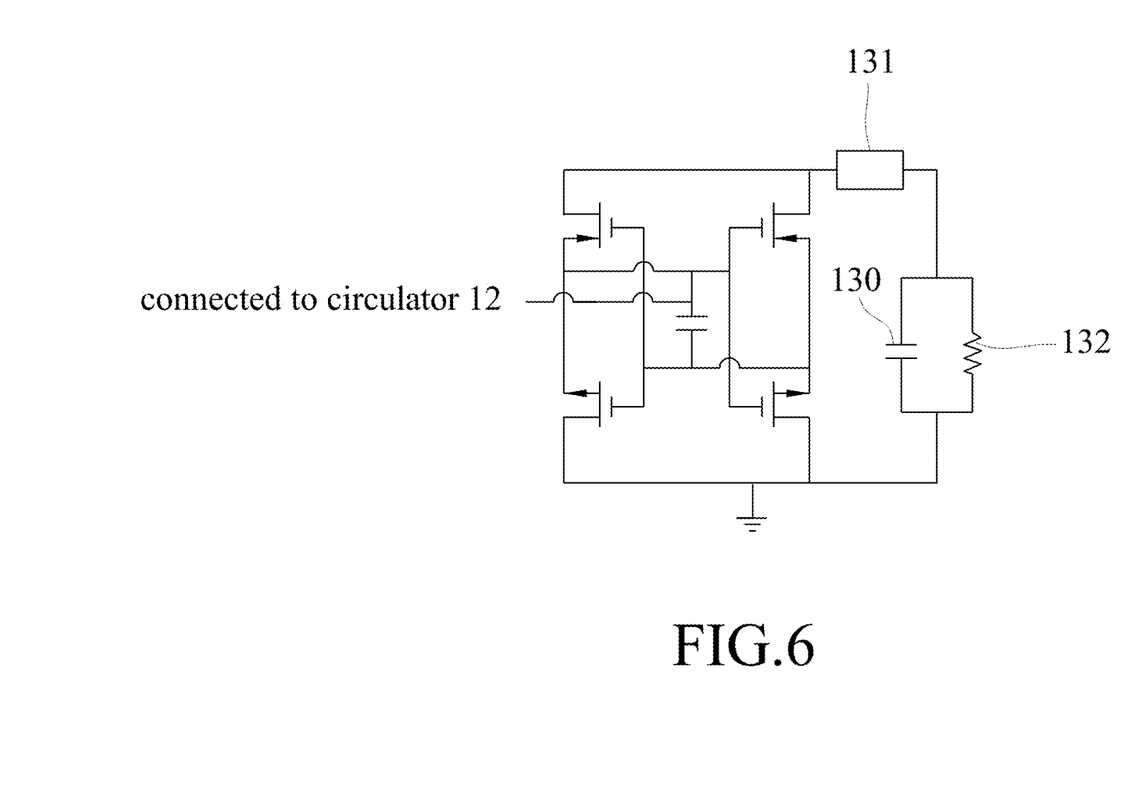
FIG. 6 is a circuit diagram illustrating a fourth embodiment of each of the first rectifying regulator and the second rectifying regulator of the wireless power module.

Referring to FIG. 3, a transmission line 131 is $\lambda_0/4$ in length, where $\lambda_0$ is a value of a fundamental wavelength. A voltage across a resistor 132 serves as the first rectified regulated signal. Referring to FIG. 4, transmission lines 133 and 134 are equal in length, while transmission lines 135, 136, 137, 138 and 139 are different in length. As an example, the transmission lines 135, 136, 137 and 138 may be respectively $$\frac{\lambda_1}{4}, \frac{\lambda_2}{4}, \frac{\lambda_3}{4} \text{ and } \frac{\lambda_4}{4}$$

in length, where $\lambda_1$, $\lambda_2$, $\lambda_3$ and $\lambda_4$ are respective values of wavelengths proportional to $$\frac{1}{f_0}, \frac{1}{2f_0}, \frac{1}{3f_0} \text{ and } \frac{1}{4f_0},$$

respectively, and $f_0$ is a value of fundamental frequency. It should be noted that in other embodiments, a DC-to-DC converter (not shown) may be further included in FIG. 3, and may be electrically connected between a common node (Q1) of the transmission line 131 and a capacitor 130, and the resistor 132. The third and fourth embodiments of the rectifying regulator 13 or 14 depicted in FIGS. 5 and 6 should be readily appreciable by those skilled in the art, and relevant description thereon is thus omitted herein for the sake of brevity.

Referring back to FIG. 2, the energy storage circuit 15 is electrically connected to the first and second rectifying regulators 13 and 14 for receiving respectively the first and second rectified regulated signals, and is configured to generate a direct current (DC) voltage according to the first and second rectified regulated signals.

The converting circuit 16 is electrically connected to the energy storage circuit 15 for receiving the DC voltage and is configured to generate the electrical energy according to the DC voltage.

Referring back to FIG. 1, the sensor module 2 is configured to sense states of the shaft and the bearing of the machine tool for generating a sensor output. In this embodiment, the sensor output includes a first sensor signal (A1) that is associated with a torque of the shaft, a second sensor signal (A2) that is associated with a displacement of the shaft, a third sensor signal (A3) that is associated with vibration of the shaft, and a fourth sensor signal (A4) that is associated with a temperature of the bearing.

The ADC module 3 is electrically connected to the sensor module 2 for receiving the first, second, third and fourth sensor signals (A1-A4), and is configured to be activated in response to receipt of an enable signal (S1) for converting the first, second, third and fourth sensor signals (A1-A4) respectively to first, second, third and fourth digital signals (D1-D4) and for outputting the first, second, third and fourth digital signals (D1-D4), and to be deactivated in response to receipt of a disable signal (S2). In this embodiment, each of the first, second, third and fourth digital signals (D1-D4) may be an 8-bit or a 16-bit signal.

The processing module 4 is electrically connected to the ADC module 3 and to the wireless transceiver module 5. The processing module 4 is configured to generate the enable signal (S1) when receiving a first control signal ($S3_1$) from the wireless transceiver module 5, to output the enable signal (S1) to the ADC module 3 for activating the ADC module 3 to generate the first, second, third and fourth digital signals (D1-D4) and to output the first, second, third and fourth digital signals (D1-D4) to the processing module 4. The processing module 4 is further configured to generate the disable signal (S2) and a switching signal (S4) when receiving the first, second, third and fourth digital signals (D1-D4) from the ADC module 3, to output the disable signal (S2) and the switching signal (S4) respectively to the ADC module 3 and the wireless transceiver module 5 for activating the ADC module 3 and for enabling the wireless transceiver module 5 to operate in a transmitting state, to generate, according to the first, second, third and fourth digital signals (D1-D4), an encoded signal (D5), and to output the encoded signal (D5) to the wireless transceiver module 5 for enabling the wireless transceiver module 5 to transmit wirelessly, according to the encoded signal (D5) from the processing module 4, a radio frequency (RF) output signal which is associated with the sensor output.

Figure 7:
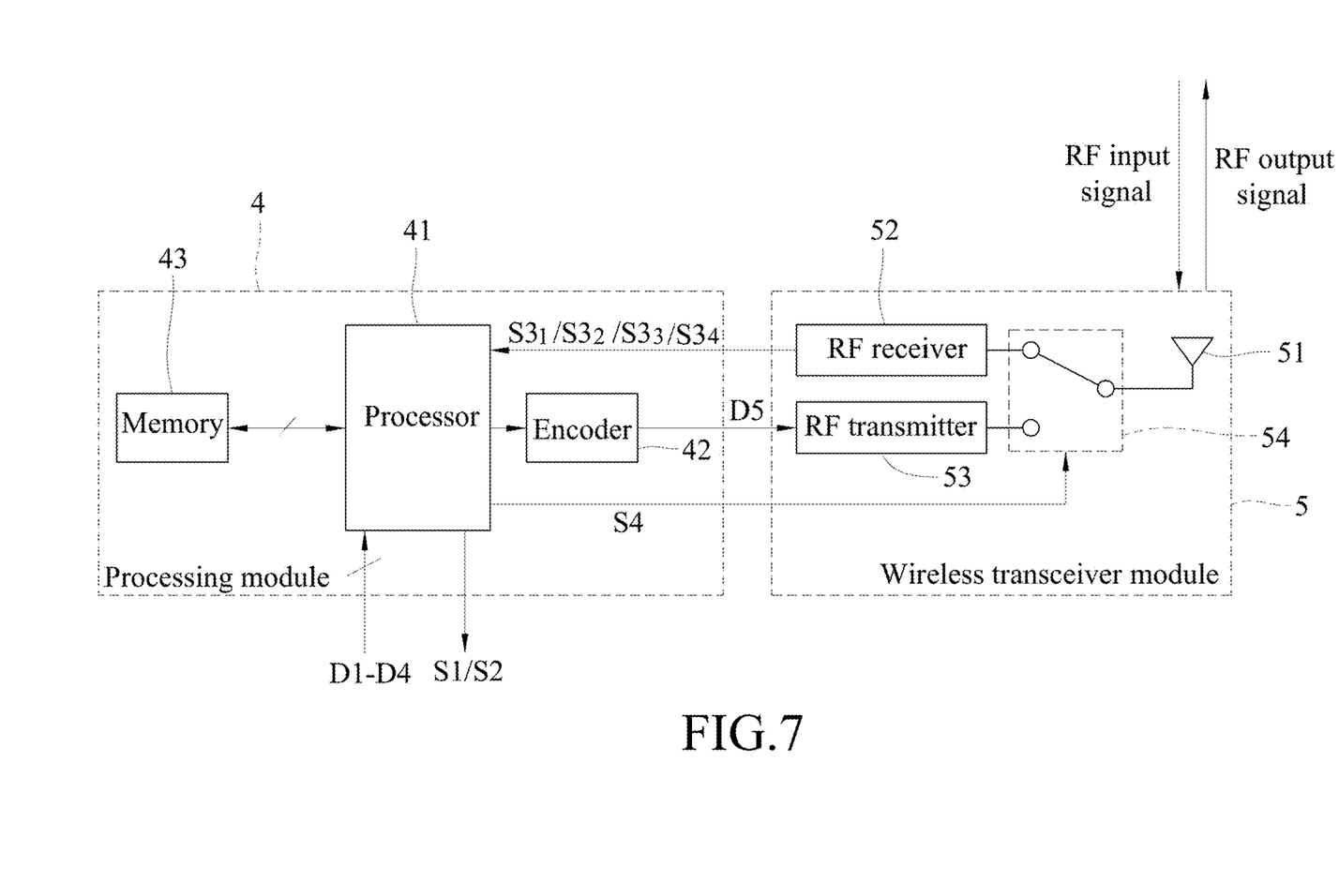
FIG. 7 is a schematic diagram illustrating an embodiment of a processing module and a wireless transceiver module of the wireless sensor.

Referring to FIGS. 1 and 7, the processing module 4 includes a processor 41, an encoder 42 and a memory 43.

The processor 41 is electrically connected to the memory 43, the wireless transceiver module 5 and the ADC module 3 for receiving one of the first control signal ($S3_1$), a second control signal ($S3_2$), a third control signal ($S3_3$) and a fourth control signal ($S3_4$) from the wireless transceiver module 5 and for receiving the first, second, third and fourth digital signals (D1-D4) from the ADC module 3.

The encoder 42 is electrically connected to the processor 41 and the wireless transceiver module 5. The encoder 42 is configured to receive the first, second, third and fourth digital signals (D1-D4) from the processor 41, to generate the encoded signal (D5) according to the first, second, third and fourth digital signals (D1-D4) thus received, and to output the encoded signal (D5) to the wireless transceiver module 5.

In this embodiment, when the processor 41 receives the first control signal ($S3_1$), the wireless sensor 100 will repeat performing a first output procedure described in the following until the processor 41 receives one of the second, third and fourth control signals ($S3_2$, $S3_3$ and $S3_4$).

In the first output procedure, when receiving the first control signal ($S3_1$), the processor 41 generates the enable signal (S1) and outputs the enable signal (S1) to the ADC module 3 so that the ADC module 3 is activated to generate the first, second, third and fourth digital signals (D1-D4). When receiving the first, second, third and fourth digital signals (D1-D4), the processor 41 stores temporarily the first, second, third and fourth digital signals (D1-D4) in the memory 43, generates the disable signal (S2) and the switching signal (S4), and outputs the disable signal (S2) and the switching signal (S4) respectively to the ADC module 3 for deactivating the ADC module 3 and the wireless transceiver module 5 for enabling the wireless transceiver module 5 to operate in the transmitting state. When the ADC module 3 is deactivated, the processor 41 outputs the first, second, third and fourth digital signals (D1-D4) that are temporarily stored in the memory 43.

In this embodiment, when the processor 41 receives the second control signal ($S3_2$) from the wireless transceiver module 5, the processor 41 generates the enable signal (S1), outputs the enable signal (S1) to the ADC module 3 for activating the ADC module 3 to generate and output the first, second, third and fourth digital signals (D1-D4). After receiving the first, second, third and fourth digital signals (D1-D4) from the ADC module 3, the processor 41 stores temporarily the first, second, third and fourth digital signals (D1-D4) in the memory 43, generates the disable signal (S2), and outputs the disable signal (S2) to the ADC module 3 so as to deactivate the ADC module 3.

When the processing module 4 receives the third control signal ($S3_3$) from the wireless transceiver module 5, the processor 41 generates the disable signal (S2), and outputs the disable signal (S2) to the ADC module 3 so as to deactivate the ADC module 3.

When the processor 41 receives the fourth control signal ($S3_4$) from the wireless transceiver module 5, the processor 41 generates the switching signal (S4), outputs the switching signal (S4) to the wireless transceiver module 5 for enabling the wireless transceiver module 5 to operate in the transmitting state, and outputs the first, second, third and fourth digital signals (D1-D4) stored in the memory 43. The encoder 42 generates the encoded signal (D5) according to the first, second, third and fourth digital signals (D1-D4) received from the processor 41, and outputs the encoded signal (D5) to the wireless transceiver module 5 for enabling the wireless transceiver module 5 to transmit wirelessly the RF output signal according to the encoded signal (D5) from the processing module 4.

The wireless transceiver module 5 is electrically connected to the processor 41 of the processing module 4 for receiving the switching signal (S4), and to the encoder 42 of the processing module 4 for receiving the encoded signal (D5). The wireless transceiver module 5 is to operate in a receiving state by default. The wireless transceiver module 5 is configured to switch from the receiving state to the transmitting state in response to receipt of the switching signal (S4), and from the transmitting state back to the receiving state after a predetermined period has elapsed. Moreover, the wireless transceiver module 5 is configured to receive wirelessly an RF input signal when the wireless transceiver module 5 operates in the receiving state, and to generate, according to the RF input signal, one of the first, second, third and fourth control signals ($S3_1$, $S3_2$, $S3_3$ and $S3_4$) for output. In this embodiment, the wireless transceiver module 5 includes an RF antenna 51, an RF receiver 52, an RF transmitter 53 and a switch circuit 54.

The RF antenna 51 is configured for receiving the RF input signal and transmitting the RF output signal.

The RF receiver 52 is electrically connected to the processor 41 of the processing module 4, and is configured to generate one of the first, second, third and fourth control signals ($S3_1$, $S3_2$, $S3_3$ and $S3_4$) according to the RF input signal when receiving the RF input signal, and to output to the processor 41 one of the first, second, third and fourth control signals ($S3_1$, $S3_2$, $S3_3$ and $S3_4$).

The RF transmitter 53 is electrically connected to the encoder 42 of the processing module 4, and is configured to generate the RF output signal according to the encoded signal (D5) in response to receipt of the encoded signal (D5) from the encoder 42. In this embodiment, the RF receiver 52 and the RF transmitter 53 utilize Bluetooth technology. However, implementations of the RF receiver 52 and the RF transmitter 53 may vary in other embodiments.

The switch circuit 54 is electrically connected to the RF antenna 51, the RF receiver 52 and the RF transmitter 53. The switch circuit 54 is configured to establish a first electrical connection between the RF receiver 52 and the RF antenna 51 when the wireless transceiver module 5 operates in the receiving state for allowing transmission of the RF input signal received by the RF antenna 51 via the switch circuit 54 to the RF receiver 52. The switch circuit 54 is further configured to establish a second electrical connection between the RF transmitter 53 and the RF antenna 51 in response to receipt of the switching signal (S4) so that the wireless transceiver module 5 operates in the transmitting state for allowing transmission of the RF output signal from the RF transmitter 53 via the switch circuit 54 and the RF antenna 51 to an external receiving device (not shown) within the predetermined period.

Specifically speaking, when the wireless transceiver module 5 operates in the receiving state, the RF antenna 51 receives the RF input signal at the beginning, and then the RF receiver 52 generates one of the first, second, third and fourth control signals ($S3_1$, $S3_2$, $S3_3$ and $S3_4$) according to the RF input signal. After that, when the processor 41 receives the first control signal ($S3_1$), the wireless sensor 100 will repeat performing a second output procedure that is described in the following and that is associated with the first output procedure described above until the processor 41 receives one of the second, third and fourth control signals ($S3_2$, $S3_3$ and $S3_4$).

In the second output procedure, the processor 41 generates the enable signal (S1), and outputs the enable signal (S1) to the ADC module 3 so that the ADC module 3 is activated to generate the first, second, third and fourth digital signals (D1-D4) for output of the same to the processor 41. When receiving the first, second, third and fourth digital signals (D1-D4), the processor 41 stores temporarily the first, second, third and fourth digital signals (D1-D4) in the memory 43, generates the disable signal (S2) and the switching signal (S4), and outputs the disable signal (S2) and the switching signal (S4) respectively to the ADC module 3 and the wireless transceiver module 5 so that the ADC module 3 is deactivated and the wireless transceiver module 5 is switched to the transmitting state. After that, the processor 41 outputs to the encoder 42 the first, second, third and fourth digital signals (D1-D4) that are temporarily stored in the memory 43. The encoder 42 generates the encoded signal (D5) according to the first, second, third and fourth digital signals (D1-D4), and outputs the encoded signal (D5) to the RF transmitter 53. Subsequently, the RF transmitter 53 generates the RF output signal according to the encoded signal (D5), and outputs the RF output signal to the receiving device within the predetermined period.

Moreover, when the processor 41 receives the fourth control signal ($S3_4$), the processor 41 generates the switching signal (S4), outputs the switching signal (S4) to the wireless transceiver module 5 so as to switch the wireless transceiver module 5 to the transmitting state, and outputs to the encoder 42 the first, second, third and fourth digital signals (D1-D4) that are temporarily stored in the memory 43. Afterward, the encoder 42 generates the encoded signal (D5) according to the first, second, third and fourth digital signals (D1-D4), and outputs the encoded signal (D5) to the RF transmitter 53. In consequence, the RF transmitter 53 generates the RF output signal according to the encoded signal (D5), and outputs the RF output signal to the receiving device within the predetermined period. It is worth noting that in other embodiments, when the processor 41 receives the fourth control signal ($S3_4$) and when there is no digital signal temporarily stored in the memory 43, the processor 41 generates the switching signal (S4), and outputs an indication signal which indicates that no digital signal is temporarily stored in the memory 43. The encoder 42 generates an encoded signal according to the indication signal, and outputs the encoded signal to the RF transmitter 53. The RF transmitter 53 generates the RF output signal according to the encoded signal, and outputs wirelessly the RF output signal to the receiving device.

In summary, since the wireless sensor 100 of this disclosure is capable of wireless transmission and reception, no physical electrical connection between the wireless sensor 100 and the external receiving device is needed for communication therebetween. Therefore, unlike a housing of a conventional machine tool, no through hole needs to be formed on the housing of the machine tool of this disclosure for passage of the physical electrical connection therethrough. Consequently, the machine tool of this disclosure has a lower manufacturing cost and a longer service life. Additionally, since no transmission line is needed for interconnecting the wireless sensor 100 and the external device, electrical wiring for the wireless sensor 100 and the external device may be simplified and restriction on placement of the wireless sensor 100 is loosened. Moreover, the wireless power module 1 enables the wireless sensor 100 to be wirelessly charged without the need for replacement of the battery as in the case of the conventional sensor. As a result, utilizing the wireless power module 1 facilitates convenience of use. Furthermore, utilizing the circulator 12 to generate the second circulator signal according to the reflected signal reduces interference that is caused by the reflected signal in wireless communication.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A wireless sensor being wirelessly powered and being applicable to a machine tool that includes a shaft and a bearing sleeved on the shaft, said wireless sensor comprising:
   a wireless power module configured
      to receive a microwave pulse signal,
      to generate electrical energy according to the microwave pulse signal, and
      to supply the electrical energy to said wireless sensor;
   a sensor module configured to sense states of the shaft and the bearing of the machine tool for generating a sensor output, the sensor output including a first sensor signal that is associated with a torque of the shaft, a second sensor signal that is associated with a displacement of the shaft, a third sensor signal that is associated with vibration of the shaft, and a fourth sensor signal that is associated with a temperature of the bearing;

an analog-to-digital converter (ADC) module electrically connected to said sensor module for receiving the first, second, third and fourth sensor signals, and configured to be activated in response to receipt of an enable signal for converting the first, second, third and fourth sensor signals respectively to first, second, third and fourth digital signals and for outputting the first, second, third and fourth digital signals, and to be deactivated in response to receipt of a disable signal;

a wireless transceiver module to operate in a receiving state by default, and configured to switch from the receiving state to a transmitting state in response to receipt of a switching signal, and from the transmitting state back to the receiving state after a predetermined period has elapsed, to receive wirelessly a radio frequency (RF) input signal when said wireless transceiver module operates in the receiving state, and to generate, according to the RF input signal, a first control signal for output; and a processing module electrically connected to said ADC module and to said wireless transceiver module, and configured to generate the enable signal when receiving the first control signal from said wireless transceiver module, to output the enable signal to said ADC module for activating said ADC module to generate the first, second, third and fourth digital signals and to output the first, second, third and fourth digital signals to said processing module, to generate the disable signal and the switching signal when receiving the first, second, third and fourth digital signals from said ADC module, to output the disable signal and the switching signal respectively to said ADC module and said wireless transceiver module for deactivating said ADC module and for enabling said wireless transceiver module to operate in the transmitting state, to generate, according to the first, second, third and fourth digital signals, an encoded signal, and to output the encoded signal to said wireless transceiver module for enabling said wireless transceiver module to transmit wirelessly, according to the encoded signal from said processing module, an RF output signal which is associated with the sensor output.

2. The wireless sensor as claimed in claim 1, wherein:

said wireless transceiver module further generates, according to the RF input signal, one of second, third and fourth control signals for output;

when said processing module receives the second control signal from said wireless transceiver module, said processing module generates the enable signal, outputs the enable signal to said ADC module for activating said ADC module to generate the first, second, third and fourth digital signals and to output the first, second, third and fourth digital signals, stores temporarily the first, second, third and fourth digital signals in said processing module, generates the disable signal when receiving the first, second, third and fourth digital signals from said ADC module, and outputs the disable signal to said ADC module so as to deactivate said ADC module;

when said processing module receives the third control signal from said wireless transceiver module, said processing module generates the disable signal, and outputs the disable signal to said ADC module so as to deactivate said ADC module; and when said processing module receives the fourth control signal from said wireless transceiver module, said processing module generates the switching signal, outputs the switching signal to said wireless transceiver module for enabling said wireless transceiver module to operate in the transmitting state, generates the encoded signal according to the first, second, third and fourth digital signals, and outputs the encoded signal to said wireless transceiver module for enabling said wireless transceiver module to transmit wirelessly the RF output signal according to the encoded signal from said processing module.

3. The wireless sensor as claimed in claim 2, wherein said processing module includes:

a memory;

a processor electrically connected to said memory, said wireless transceiver module and said ADC module for receiving one of the first, second, third and fourth control signals from said wireless transceiver module and for receiving the first, second, third and fourth digital signals from said ADC module, and configured to when receiving the first control signal, generate the enable signal and output the enable signal to said ADC module, when receiving the first, second, third and fourth digital signals, store temporarily the first, second, third and fourth digital signals in said memory, generate the disable signal and the switching signal, and output the disable signal and the switching signal respectively to said ADC module and said wireless transceiver module, and when said ADC module is deactivated, output the first, second, third and fourth digital signals that are temporarily stored in said memory; and an encoder electrically connected to said processor and said wireless transceiver module, and configured to receive the first, second, third and fourth digital signals from said processor, to generate the encoded signal according to the first, second, third and fourth digital signals thus received, and to output the encoded signal to said wireless transceiver module.

4. The wireless sensor as claimed in claim 3, wherein:

when said processor receives the second control signal, said processor generates the enable signal, outputs the enable signal to said ADC module, and when said processor receives the first, second, third and fourth digital signals, stores temporarily the first, second, third and fourth digital signals in said memory, generates the disable signal, and outputs the disable signal to said ADC module;

when said processor receives the third control signal, said process or generates the disable signal, and outputs the disable signal to said ADC module; and when said processor receives the fourth control signal, said processor generates the switching signal, outputs the switching signal to said wireless transceiver module, and outputs to said encoder the first, second, third and fourth digital signals that are temporarily stored in said memory.

5. The wireless sensor as claimed in claim 3, wherein said wireless transceiver module includes:

an RF antenna for receiving the RF input signal and transmitting the RF output signal;

an RF receiver electrically connected to said processor of said processing module, and configured to generate one of the first, second, third and fourth control signals according to the RF input signal when receiving the RF input signal, and to output to said processor one of the first, second, third and fourth control signals;

an RF transmitter electrically connected to said encoder of said processing module, and configured to generate the RF output signal according to the encoded signal in response to receipt of the encoded signal from said encoder; and a switch circuit electrically connected to said RF antenna, said RF receiver and said RF transmitter, and configured to establish a first electrical connection between said RF receiver and said RF antenna when said wireless transceiver module operates in the receiving state for allowing transmission of the RF input signal received by said RF antenna via said switch circuit to said RF receiver, and to establish a second electrical connection between said RF transmitter and said RF antenna in response to receipt of the switching signal when said wireless transceiver module operates in the transmitting state for allowing transmission of the RF output signal from said RF transmitter via said switch circuit to said RF antenna within the predetermined period.

6. The wireless sensor as claimed in claim 5, wherein said RF receiver and said RF transmitter utilize Bluetooth technology.

7. The wireless sensor as claimed in claim 1, wherein said wireless power module includes:

a microwave antenna configured to receive the microwave pulse signal;

a low-pass filter (LPF) electrically connected to said microwave antenna for receiving the microwave pulse signal therefrom and configured to generate a filtered signal according to the microwave pulse signal;

a circulator electrically connected to said LPF for receiving the filtered signal therefrom, and configured to generate a first circulator signal according to the filtered signal, and to generate a second circulator signal according to a reflected signal that is associated with a reflection of the first circulating signal;

a first rectifying regulator electrically connected to said circulator for receiving the first circulator signal therefrom, and configured to generate a first rectified regulated signal by rectifying the first circulating signal, to generate the reflected signal according to the first circulator signal, and to output the reflected signal to said circulator;

a second rectifying regulator electrically connected to said circulator for receiving the second circulator signal therefrom, and configured to generate a second rectified regulated signal by rectifying the second circulator signal;

an energy storage circuit electrically connected to said first and second rectifying regulators for receiving respectively the first and second rectified regulated signals, and configured to generate a direct current (DC) voltage according to the first and second rectified regulated signals; and a converting circuit electrically connected to said energy storage circuit for receiving the DC voltage and configured to generate the electric power according to the DC voltage.

8. A machine tool comprising a shaft;

a bearing sleeved on said shaft;

a wireless sensor as claimed in claim 1; and a housing that is made of a non-conductive material for accommodating said shaft, said bearing and said wireless sensor.

9. The machine tool as claimed in claim 8, wherein said housing is made of a material selected from the group consisting of a carbon fiber composite material, fiber-reinforced plastic (FRP), and a combination thereof.

* * * * *